United States Patent
Huang

(10) Patent No.: US 11,188,635 B2
(45) Date of Patent: Nov. 30, 2021

(54) FILE AUTHENTICATION METHOD AND APPARATUS

(71) Applicant: Tencent Technology (Shenzhen) Company Limited, Shenzhen (CN)

(72) Inventor: Wu Huang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 395 days.

(21) Appl. No.: 15/974,241

(22) Filed: May 8, 2018

(65) Prior Publication Data

US 2018/0253545 A1 Sep. 6, 2018

Related U.S. Application Data

(63) Continuation of application No. PCT/CN2017/084042, filed on May 12, 2017.

(30) Foreign Application Priority Data

May 24, 2016 (CN) .................. 201610349815.X

(51) Int. Cl.
   *G06F 21/44* (2013.01)
   *G06F 21/57* (2013.01)
   (Continued)

(52) U.S. Cl.
   CPC ............... *G06F 21/44* (2013.01); *G06F 8/60* (2013.01); *G06F 8/61* (2013.01); *G06F 16/148* (2019.01);
   (Continued)

(58) Field of Classification Search
   CPC .. G06F 21/10; G06F 21/12–121; G06F 21/30; G06F 21/44; G06F 21/45;
   (Continued)

(56) References Cited

U.S. PATENT DOCUMENTS 8,756,432 B1* 6/2014 Chen ................. G06F 21/51
                                                   713/188
9,292,694 B1* 3/2016 Valceanu ............ G06F 21/51
(Continued)

FOREIGN PATENT DOCUMENTS

CN   101639880 A   2/2010
CN   103020516 A   4/2013
(Continued)

OTHER PUBLICATIONS

International Search Report, dated Aug. 23, 2017, for PCT/CN2017/084042, 9pgs.
(Continued)

*Primary Examiner* — Kevin Bechtel
*Assistant Examiner* — D'Arcy Winston Straub
(74) *Attorney, Agent, or Firm* — Oblon, McClelland, Maier & Neustadt, L.L.P.

(57) ABSTRACT

A file authentication method and apparatus are provided in the embodiments of this application. File digest data is extracted from a file that includes an installation package of an application. The file digest data identifies file information of the file. A feature character string of the file is generated based on the file digest data. File information of a target file is determined from a feature database based on the feature character string of the file. The target file matches the feature character string of the file, the feature database stores at least file information and feature character strings of a plurality of genuine files, and the file information of the target file and the file information of the plurality of genuine files include at least a certificate feature value. The file is authenticated according to the file information of the target file and the file information of the file.

17 Claims, 6 Drawing Sheets

(51) Int. Cl.
*G06F 21/64* (2013.01)
*G06F 21/51* (2013.01)
*G06F 8/60* (2018.01)
*G06F 8/61* (2018.01)
*G06F 16/14* (2019.01)
*G06F 21/30* (2013.01)

(52) U.S. Cl.
CPC .............. *G06F 21/51* (2013.01); *G06F 21/57* (2013.01); *G06F 21/64* (2013.01); *G06F 21/30* (2013.01)

(58) Field of Classification Search
CPC ....... G06F 21/50–51; G06F 21/57–577; G06F 8/60–61
See application file for complete search history.

(56) References Cited

U.S. PATENT DOCUMENTS

| | | | |
|---|---|---|---|
| 9,916,448 B1* | 3/2018 | Zhang | G06F 21/564 |
| 2012/0240236 A1* | 9/2012 | Wyatt | G06F 21/10 726/25 |
| 2013/0160147 A1 | 6/2013 | Draluk et al. | |
| 2013/0276105 A1* | 10/2013 | Hinchliffe | G06F 21/51 726/22 |
| 2015/0244729 A1* | 8/2015 | Mao | G06F 21/64 726/24 |
| 2015/0288707 A1* | 10/2015 | Liu | G06F 21/564 726/24 |
| 2016/0110543 A1* | 4/2016 | Park | G06F 21/563 726/22 |
| 2016/0142409 A1* | 5/2016 | Frei | H04L 63/0884 713/176 |
| 2016/0234625 A1* | 8/2016 | Wang | H04L 67/06 |
| 2016/0267270 A1* | 9/2016 | Lee | H04W 4/12 |

FOREIGN PATENT DOCUMENTS

| | | |
|---|---|---|
| CN | 103324697 A | 9/2013 |
| CN | 104486312 A | 4/2015 |
| CN | 104657634 A | 5/2015 |
| CN | 104980816 A | 10/2015 |
| CN | 105045633 A | 11/2015 |
| EP | 0 980 047 A2 | 2/2000 |

OTHER PUBLICATIONS

Written Opinion of the International Searching Authority for corresponding PCT/CN2017/084042, dated Aug. 23, 2017.
International Preliminary Report on Patentability for corresponding PCT/CN2017/084042, dated Nov. 27, 2018.
Chinese Office Action for corresponding CN201610349815X, dated Dec. 13, 2018.

* cited by examiner

FILE AUTHENTICATION METHOD AND APPARATUS

RELATED APPLICATION

This application is a continuation of International Application No. PCT/CN2017/084042, filed on May 12, 2017, which claims priority to Chinese Patent Application No. 201610349815.X, entitled "FILE AUTHENTICATION METHOD AND APPARATUS" filed with the Patent Office of China on May 24, 2016. The entire disclosures of the prior applications are hereby incorporated by reference in their entirety.

FIELD OF THE TECHNOLOGY

The present disclosure relates to the field of network technologies, and in particular, to a file authentication method and apparatus.

BACKGROUND OF THE DISCLOSURE

With popularization of networks and intelligent terminals and continuous development of network technologies, service providers may provide services to users by means of installed application packages (APKs). That is, terminals use the services provided by the service providers by means of the installed APKs. However, some developers maliciously imitate legal or official application programs to violate privacy of the users and interests of the service providers. To avoid the foregoing situation, authentication needs to be performed on an APK to determine whether the APK is a counterfeit APK, thereby protecting privacy of the users and interests of the service providers.

In the related technology, a current APK authentication method may be: when finding any application program that might counterfeit another application, a user or development personnel reports the application, and authentication personnel manually perform authentication on an APK of the reported application according to the report information to obtain an authentication result.

In a process of implementing the present disclosure, the related technology at least has the following problems:

The file authentication method overly depends on manpower and has a risk of missing a counterfeit APK file, leading to a potential threat to information security of users and interests of service providers.

SUMMARY

To resolve a problem in the related technology, embodiments of the present disclosure provide a file authentication method and apparatus. The technical solutions are as follows:

In an embodiment of the present disclosure, there is provided a file authentication method. File digest data is extracted from a file that includes an installation package of an application. The file digest data identifies file information of the file. A feature character string of the file is generated based on the file digest data. File information of a target file is determined from a feature database based on the feature character string of the file. The target file matches the feature character string of the file, the feature database stores at least file information and feature character strings of a plurality of genuine files, and the file information of the target file and the file information of the plurality of genuine files include at least a certificate feature value. The file is authenticated according to the file information of the target file and the file information of the file.

In an embodiment of the present disclosure, there is provided a file authentication apparatus. The file authentication apparatus includes a memory and processing circuitry. The processing circuitry extracts file digest data from a file that includes an installation package of an application. The file digest data identifies file information of the file. The processing circuitry generates a feature character string of the file based on the file digest data. The processing circuitry determines file information of a target file from a feature database based on the feature character string of the file. The target file matches the feature character string of the file, the feature database stores at least file information and feature character strings of a plurality of genuine files, and the file information of the target file and the file information of the plurality of genuine files include at least a certificate feature value. The processing circuitry authenticates the file according to the file information of the target file and the file information of the file.

The technical solutions provided in the embodiments of the present disclosure have the following beneficial effects:

By extracting file digest data from a file, generating a feature character string of the file according to the file digest data, and further determining file information of a target file from a feature database according to the feature character string of the file, to authenticate the file according to the file information of the target file, a file can be actively collected, authentication is performed on the file to determine whether the file is a genuine application or a counterfeit version of a genuine application, and an authentication result is correspondingly stored into a feature database, so that a counterfeit application can be cracked down, and information security of users and interests of service providers are ensured.

BRIEF DESCRIPTION OF THE DRAWINGS

To describe the technical solutions of the embodiments of the present disclosure more clearly, the following briefly introduces the accompanying drawings for describing the embodiments. The accompanying drawings in the following description show merely some embodiments of the present disclosure, and a person of ordinary skill in the technology may still derive other drawings from these accompanying drawings.

DESCRIPTION OF EMBODIMENTS

To make the objectives, technical solutions, and advantages of the present disclosure clearer, the following further describes implementations of the present disclosure in detail with reference to the accompanying drawings.

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

Figure 1:
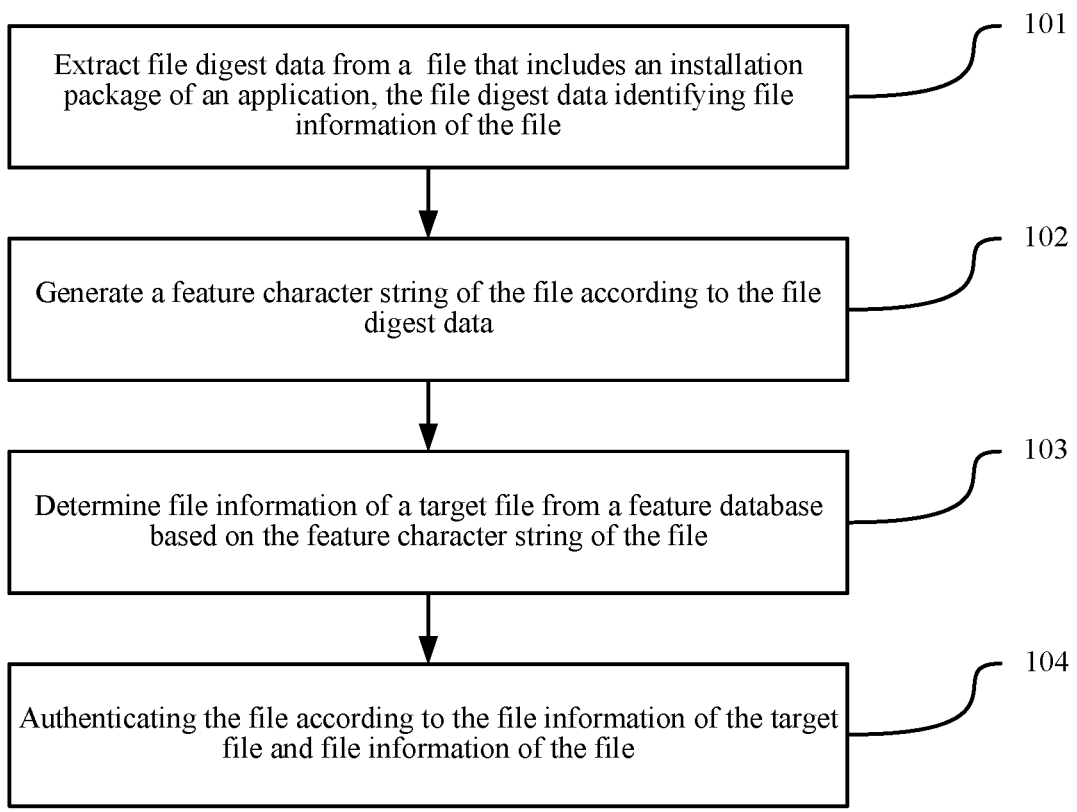
FIG. 1 is a flowchart of a file authentication method according to an embodiment of the present disclosure.

FIG. 1 is a flowchart of a file authentication method according to an embodiment of the present disclosure. As shown in FIG. 1, the following steps are included:

In step 101, extract file digest data from a to-be-authenticated file (or a file)that includes an installation package of a to-be-authenticated application, the file digest data identifying file content (or information) of the to-be-authenticated file.

In step 102, generate a feature character string of the to-be-authenticated file based on the file digest data.

In step 103, determine file information of a target file from a feature database according to the feature character string of the to-be-authenticated file, the target file matching the feature character string of the to-be-authenticated file, the feature database storing at least file information and feature character strings of a plurality of genuine files, and the file information of the target file and the file information of the plurality of genuine files including at least a certificate feature value.

In step 104, authenticate the to-be-authenticated file according to the file information of the target file and file information of the to-be-authenticated file.

According to the method provided by this embodiment of the present disclosure, by extracting file digest data from a to-be-authenticated file, generating a feature character string of the to-be-authenticated file according to the file digest data, and further determining file information of a target file from a feature database according to the feature character string of the to-be-authenticated file, to authenticate the to-be-authenticated file according to the file information of the target file, a to-be-authenticated file can be actively collected, authentication is performed on the to-be-authenticated file to determine whether the to-be-authenticated file is a genuine application or a counterfeit version of a genuine application, and an authentication result is correspondingly stored into a feature database, so that a counterfeit application can be cracked down, and information security of users and interests of service providers are ensured.

In a first implementation of the present disclosure, the authenticating the to-be-authenticated file according to the file information of the target file and file information of the to-be-authenticated file includes:

when the file information of the target file is consistent with the file information of the to-be-authenticated file, determining that the authentication on the to-be-authenticated file succeeds; and when the file information of the target file is inconsistent with the file information of the to-be-authenticated file, determining that the authentication on the to-be-authenticated file fails.

In a second implementation of the present disclosure, the determining file information of a target file from a feature database according to the feature character string of the to-be-authenticated file includes:

calculating similarity between the feature character string of the to-be-authenticated file and each of the feature character strings in the feature database; and determining a file corresponding to a characteristic character string having the similarity within a preset range as a target file of the to-be-authenticated file. For example, the method includes selecting at least one of the feature character strings in the feature database having the similarity within a preset range as the target file.

In a third implementation of the present disclosure, the similarity is a Hamming distance.

In a fourth implementation of the present disclosure, the file digest data is a digest file, the digest file stores file names, file types, and digest information of all resource files in the to-be-authenticated file; and correspondingly, the generating a feature character string of the to-be-authenticated file according to the file digest data includes:

generating, according to the file names, file types, and digest information of all the resource files, feature text in accordance with a specified rule; and generating the feature character string of the to-be-authenticated file according to the feature text.

In a fifth implementation of the present disclosure, the generating the feature character string of the to-be-authenticated file according to the feature text includes:

generating the feature character string of the to-be-authenticated file according to the feature text by using a sensitive hashing (simhash) algorithm.

In a sixth implementation of the present disclosure, the generating, according to the file names, file types, and digest information of all the resource files, feature text in accordance with a specified rule includes:

obtaining specified digest information from all the resource files according to the file types of all the resource files, where the specified digest information is digest information of a resource file of a specified type; and generating the feature text according to the specified digest information.

In a seventh implementation of the present disclosure, the file digest data is an application icon of the to-be-authenticated application; and correspondingly, the generating a feature character string of the to-be-authenticated file according to the file digest data includes:

generating the feature character string of the to-be-authenticated file according to the application icon of the to-be-authenticated application.

In an eighth possible implementation of the present disclosure, the generating the feature character string of the to-be-authenticated file according to the application icon of the to-be-authenticated application includes:

generating the feature character string of the to-be-authenticated file according to the application icon of the to-be-authenticated application by using a perceptual hash (pHash) algorithm or a scale invariant feature transform (SIFT) algorithm.

In a ninth implementation of the present disclosure, the file digest data includes an application icon and a digest file of the to-be-authenticated application, and correspondingly, the generating a feature character string of the to-be-authenticated file according to the file digest data includes:

generating a first feature character string of the to-be-authenticated file according to the application icon of the to-be-authenticated application;

generating feature text according to the digest file, and generating a second feature character string of the to-be-authenticated file according to the feature text; and generating the feature character string of the to-be-authenticated file according to the first feature character string and the second feature character string.

In a tenth implementation of the present disclosure, the feature database further stores a whitelist, and correspondingly, the authenticating the to-be-authenticated file according to the file information of the target file and file information of the to-be-authenticated file includes:

when the file information of the target file is inconsistent with the file information of the to-be-authenticated file, querying whether the whitelist stores the file information of the to-be-authenticated file;

when the whitelist stores the file information of the to-be-authenticated file, determining that the authentication on the to-be-authenticated file succeeds; and when the whitelist does not store the file information of the to-be-authenticated file, determining that the authentication on the to-be-authenticated file fails.

In an eleventh implementation of the present disclosure, the whitelist stores file information of all genuine files.

In a twelfth implementation of the present disclosure, after the authenticating the to-be-authenticated file according to the file information of the target file and file information of the to-be-authenticated file, the method further includes:

when the to-be-authenticated file is successfully authenticated, storing the feature character string and the file information of the to-be-authenticated file into the feature database.

In a thirteenth implementation of the present disclosure, the feature database further stores file information and feature character strings of a plurality of non-genuine files and an authentication result of each file in the plurality of genuine files and the plurality of non-genuine files, and correspondingly, the authenticating the to-be-authenticated file according to the file information of the target file and file information of the to-be-authenticated file includes:

when the file information of the target file is consistent with the file information of the to-be-authenticated file, and the target file is a file that is successfully authenticated, determining that the authentication on the to-be-authenticated file succeeds; and when the file information of the target file is consistent with the file information of the to-be-authenticated file, and the target file is a file that is not successfully authenticated, determining that the authentication on the to-be-authenticated file fails.

In a fourteenth implementation of the present disclosure, after the authenticating the to-be-authenticated file according to the file information of the target file and file information of the to-be-authenticated file, the method further includes: storing the feature character string, the file information, and an authentication result of the to-be-authenticated file into the feature database.

In a fifteenth implementation of the present disclosure, the file information further includes a file name, and correspondingly, the method further includes:

receiving a query request from a device, the query request including at least a file name of a to-be-queried file;

obtaining, according to the file name, a file name of at least one matching file and a corresponding authentication result from the feature database; and sending a query result to the device, the query result including at least the file name of the at least one matching file and the corresponding authentication result, and the file name of the at least one matching file and the corresponding authentication result being displayed on an interface of the device.

In a sixteenth implementation of the present disclosure, feature character string information in the feature database is stored in a form of a K-D tree.

An embodiment of the present disclosure may be formed by using any one or a combination of all the foregoing technical solutions, and details are not described herein.

It is noted that the non-genuine file described in the embodiments of the present disclosure is an installation package of a counterfeit application. An execution body of this embodiment is a server. The server may be a server configured to release applications, for example, an application store server. An application may be uploaded to the server by means of a third party, so that a subsequent file authentication method is performed, and after the authentication succeeds, the application uploaded by the third party is released on a web page provided by the application store server, to facilitate users viewing and downloading the application. The server may alternatively perform authentication based on existing applications of the application store, so as to prevent counterfeit applications from obtaining illegitimate benefits. The server may alternatively be a server configured to perform file authentication and is independent of an application store server, so as to serve a plurality of application stores simultaneously.

Figure 2A:
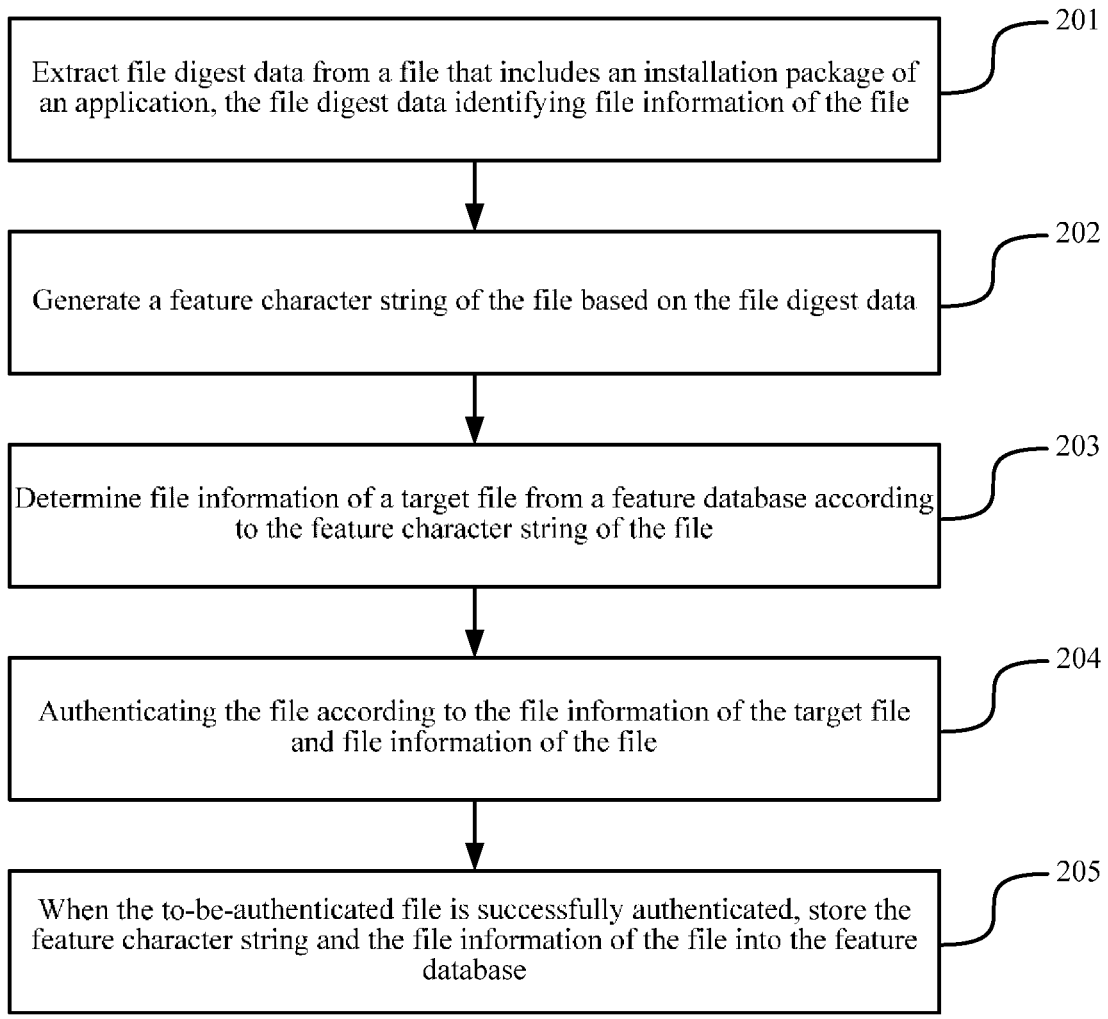
FIG. 2A is a flowchart of a file authentication method according to an embodiment of the present disclosure.

FIG. 2A is a flowchart of a file authentication method according to an embodiment of the present disclosure. Referring to FIG. 2A, the method includes:

In step 201, extract file digest data from a to-be-authenticated file that includes an installation package of a to-be-authenticated application, the file digest data identifying file content of the to-be-authenticated file.

In the embodiments of the present disclosure, an installation package of a to-be-authenticated application is an application package (APK). Usually, the to-be-authenticated file is a compressed file. When the to-be-authenticated file is obtained, a decompression operation is performed on the to-be-authenticated file, so as to extract file digest data from the to-be-authenticated file. The file digest data is used for uniquely identifying file content of the to-be-authenticated file. The to-be-authenticated file may alternatively not be a compressed file. No limitation is imposed in this embodiment of the present disclosure.

Specifically, when receiving the to-be-authenticated file, the server may detect a file format of the to-be-authenticated file. When the file format indicates that the to-be-authenticated file is a compressed file, a decompression operation and subsequent steps are performed on the to-be-authenticated file. When the file format indicates the to-be-authenticated file is not a compressed file, a decompression operation is skipped, and subsequent authentication steps are directly performed.

In this embodiment of the present disclosure, the file digest data includes an application icon and a digest file of the to-be-authenticated application. The file digest data may alternatively be either of the application icon and the digest file of the to-be-authenticated application, or may be other data capable of uniquely identifying file content of the to-be-authenticated file. No specific limitation is made in this embodiment of the present disclosure.

The digest file stores file names, file types, and digest information of all resource files in the to-be-authenticated file. For example, the digest file may be a MANIFEST.MF file in an APK file. The MANIFEST.MF file records digest information of all resource files in the APK file. The digest information of each resource file is used for uniquely identifying the corresponding resource file. In another example, the MANIFEST.MF file records file feature values or file identifiers of all resource files in the APK file.

In another embodiment of the present disclosure, before file digest data is extracted from the to-be-authenticated file, it is needed to first collect the to-be-authenticated file. A specific collection method may be performing collection from various application stores. The application store is a platform configured to provide various applications for users to download. Because for terminals having different brands or different systems, different terminals or system developers provide corresponding applications for users to download, various applications on the application market are collected as much as possible by collecting the to-be-authenticated file from the various application stores, so as to crack down non-genuine applications to a largest extent. The method for collecting the to-be-authenticated file may alternatively be performing collection from application download links of a web page. The to-be-authenticated file may alternatively be collected by means of another method. No limitation is imposed in this embodiment of the present disclosure. It is noted that during the collection process, the to-be-authenticated file can be collected in batch. Moreover, while the file authentication method described in this embodiment of the present disclosure is directed to one to-be-authenticated file, the method in this embodiment of the present disclosure can also be used in a specific implementation directed to a plurality of to-be-authenticated files.

By collecting the to-be-authenticated file, authentication can be performed, to a largest extent, on installation packages of all applications that can be downloaded by users, so as to further crack down counterfeit applications, thereby ensuring information security of users and interests of developers of genuine applications. It is noted that the non-genuine application described in this embodiment of the present disclosure is an application developed by imitating a genuine APK.

In step 202, generate a feature character string of the to-be-authenticated file according to the file digest data.

A method for generating a feature character string of the to-be-authenticated file differs as specific content of the file digest data differs. When the file digest data includes an application icon and a digest file of the to-be-authenticated application, according to the file digest data, the method for generating a feature character string of the to-be-authenticated file may include: generating a first feature character string of the to-be-authenticated file according to the application icon of the to-be-authenticated application; generating feature text according to the digest file, and generating a second feature character string of the to-be-authenticated file according to the feature text generate; and generating the feature character string of the to-be-authenticated file according to the first feature character string and the second feature character string.

A method for generating a feature character string of the to-be-authenticated file according to the application icon of the to-be-authenticated application may be: generating a first feature character string of the to-be-authenticated file according to the application icon of the to-be-authenticated application by using a perceptual hash (pHash) algorithm or a scale invariant feature transform (SIFT) algorithm. The first feature character string of the to-be-authenticated file may alternatively be calculated by using another algorithm. No specific limitation is imposed in this embodiment of the present disclosure.

Because a non-genuine application usually imitates an application icon of a genuine application, in this embodiment of the present disclosure, the application icon is used as a reference criterion for performing authentication on the to-be-authenticated file, that is, determining, according to whether the application icon of the to-be-authenticated application is an imitation of another genuine application, whether the to-be-authenticated file is an imitation of the genuine application.

In addition, there are also some malicious developers imitating resource files in installation package files of genuine applications, develop non-genuine applications, and harm the interests of developers of genuine applications. When the file digest data is a digest file, the generating a feature character string of the to-be-authenticated file according to the file digest data includes: generating feature text according to file names, file types, and digest information of all the resource files; and generating a second feature character string of the to-be-authenticated file according to the feature text.

A method for generating, according to the file names, file types, and digest information of all the resource files, feature text in accordance with a specified rule may be: obtaining specified digest information from all the resource files according to the file types of all the resource files, where the specified digest information is digest information of a resource file of a specified type; and generating the feature text according to the specified digest information. That is, the specified rule is selecting digest information of a resource file of a specified type. The specified rule may alternatively be another rule. No limitation is imposed in this embodiment of the present disclosure.

For example, when the specified type is a png type, files whose file extension is ".png" are obtained from all the resource files, and digest information of the resource files of the specified type are obtained. The specified digest information is arranged in order to generate feature text. The arrangement may be performed in alphabetical order of the files of the specified type, or the arrangement may be performed according to file generation time points. No specific limitation is imposed in this embodiment of the present disclosure.

Figure 2B:
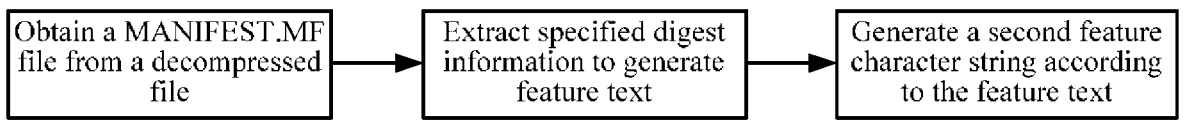
FIG. 2B is a flowchart of a method for generating a second feature character string according to an embodiment of the present disclosure.

A method for generating a second feature character string of the to-be-authenticated file according to the feature text may be: generating the second feature character string of the to-be-authenticated file according to the feature text by using a sensitive hashing (simhash) algorithm. When the file digest data is a digest file, a procedure of generating the second feature character string of the to-be-authenticated file may be represented by FIG. 2B.

By obtaining specified digest information from the digest file of the to-be-authenticated file, generating feature text according to the specified digest information, and further generating the second feature character string of the to-be-authenticated file according to the feature text, resource files in the to-be-authenticated file can be used as reference criteria, and authentication can be performed on the to-be-authenticated file in terms of specific content of the application.

A method for generating the feature character string of the to-be-authenticated file according to the first feature character string and the second feature character string may be: directly joining the first feature character string and the second feature character string successively to generate the feature character string of the to-be-authenticated file, or inserting the first feature character string to a specified location of the second feature character string to generate the feature character string of the to-be-authenticated file. The feature character string of the to-be-authenticated file can alternatively be generated by using another method. No specific limitation is imposed in this embodiment of the present disclosure.

It is noted that the step of generating the feature character string of the to-be-authenticated file according to the first feature character string and the second feature character string may be performed or not performed. No limitation is imposed in this embodiment of the present disclosure. When the step is not performed, authentication can be performed on the application icon and the digest file of the to-be-authenticated application respectively according to the first feature character string and the second feature character string, and an authentication result of the to-be-authenticated file can be further determined according to authentication results of the application icon and the digest file of the to-be-authenticated application.

In step 203, determine file information of a target file from a feature database according to the feature character string of the to-be-authenticated file, the target file is a file matching the feature character string of the to-be-authenticated file, the feature database storing at least file information and feature character strings of a plurality of genuine files, and the file information of the target file and the file information of the plurality of genuine files including at least a certificate feature value.

When the feature database stores at least file information and feature character strings of a plurality of genuine files, so that authentication can be performed on the to-be-authenticated file, the to-be-authenticated file is only compared with the genuine files stored in the feature database, to achieve an authentication objective while reducing a memory space occupied by the feature database. In addition, when a user makes a query, only feeding back file information of genuine files to the user can also be achieved, to ensure that an application installed by the user is a genuine application.

In addition to file information and feature character strings of a plurality of genuine files, the feature database may further store file information and feature character strings of a plurality of non-genuine files and an authentication result of each of the plurality of genuine files and the plurality of non-genuine files, so that when receiving a query request for an authentication result from a user, the feature database can quickly feed back the authentication result. The query request for an authentication result is used for querying whether any to-be-queried file is a genuine file, and the query request for an authentication result carries at least file information of the to-be-queried file.

A method for determining file information of a target file from a feature database according to the feature character string of the to-be-authenticated file may be: calculating similarity between the feature character string of the to-be-authenticated file and each feature character string in the feature database; and determining a file corresponding to a characteristic character string having the similarity within a preset range as a target file of the to-be-authenticated file.

The preset range differs as a similarity calculation method differs. No limitation is imposed on both a setting method and specific values of the preset range in this embodiment of the present disclosure. The certificate feature value is a feature value obtained after encrypting a certificate of the to-be-authenticated application by using an encryption algorithm. The feature value may be a message-digest 5 (MD5) algorithm feature value or another value obtained by using another algorithm. No limitation is imposed in this embodiment of the present disclosure. It is noted that in addition to the certificate feature value, the file information may further include other information such as a file name, a feature value of the file. No specific limitation is imposed in this embodiment of the present disclosure.

In another embodiment of the present disclosure, the similarity is a Hamming distance. The Hamming distance indicates a quantity of different characters at corresponding positions of two character strings. Correspondingly, a method for determining file information of a target file from a feature database according to the feature character string of the to-be-authenticated file may be: calculating a Hamming distance between the feature character string of the to-be-authenticated file and each feature character string in the feature database; and determining a file corresponding to a characteristic character string having the Hamming distance smaller than a preset distance as a target file of the to-be-authenticated file, that is, determining that there might be a counterfeiting relationship between the target file and the to-be-authenticated file.

It is noted that when the file digest data include an application icon and a digest file of the to-be-authenticated application, if the first feature character string corresponding to the application icon and the second character string corresponding to the digest file are not combined, similarity between the first feature character string and feature character string corresponding to the file digest data in the feature database and similarity between the second feature character string and feature character string corresponding to the file digest data in the feature database are separately calculated, and then a first target file similar to the application icon and a second target file similar to the digest file are separately determined.

If the first feature character string and the second character string are not combined, file information of a file that might counterfeit the application icon of the to-be-authenticated application and file information of a file might counterfeit the digest file of the to-be-authenticated application can be separately obtained. In addition, the first feature character string and the second feature character string are separately stored, so that a speed of obtaining file information of a target file is improved, thereby improving file authentication efficiency.

In another embodiment of the present disclosure, feature character string information in the feature database is stored in a form of a K-D tree. That is, the feature character string is divided into multi-dimensional nodes for storage. When a target file of the to-be-authenticated file is determined, the feature character string of the to-be-authenticated file is divided into multi-dimensional nodes, a similar feature character string is searched for in the K-D tree according to a division result, and similarity between the feature character string of the to-be-authenticated file and the similar feature character string is calculated. If the similarity falls within a preset range, a file corresponding to the similar feature character string is determined as the target file, that is, a file that might be in a counterfeiting relationship with the to-be-authenticated file.

Storing the feature character string in a form of a K-D tree can improve a speed of determining a target file, thereby improving efficiency of performing authentication on the to-be-authenticated file.

In step 204, authenticating the to-be-authenticated file according to the file information of the target file and file information of the to-be-authenticated file.

When the feature database stores at least file information and feature character strings of a plurality of genuine files, a method for authenticating the to-be-authenticated file according to the file information of the target file and file information of the to-be-authenticated file may be: if file information of the target file is consistent with the file information of the to-be-authenticated file, determining that the authentication on the to-be-authenticated file succeeds, that is, determining that the to-be-authenticated file and the target file are files belonging to a same application; and if file information of the target file is inconsistent with the file information of the to-be-authenticated file, determining that the authentication on the to-be-authenticated file fails, that is, determining that the to-be-authenticated file is a counterfeit version of the target file, that is, the to-be-authenticated application is a counterfeit version of the application corresponding to the target file.

In another embodiment of the present disclosure, the feature database further stores a whitelist, and correspondingly, the method for authenticating the to-be-authenticated file according to the file information of the target file and file information of the to-be-authenticated file may alternatively be: if the file information of the target file is inconsistent with the file information of the to-be-authenticated file, querying whether the whitelist stores the file information of the to-be-authenticated file; if the whitelist stores the file information of the to-be-authenticated file, determining that the authentication on the to-be-authenticated file succeeds; and if the whitelist does not store the file information of the to-be-authenticated file, determining that the authentication on the to-be-authenticated file fails. The whitelist stores file information of all genuine files.

That is, when it is determined by authentication that the feature character string of the to-be-authenticated file is inconsistent with the feature character string of the target file, a method for further determining by authentication whether the to-be-authenticated file is a file corresponding to a genuine application is: determining by authentication whether the whitelist stores file information of the to-be-authenticated file, if yes, determining that the to-be-authenticated application is a genuine application, and if not, determining that the to-be-authenticated application is a counterfeit version of the application corresponding to the target file.

In still another embodiment of the present disclosure, the feature database further stores file information and feature character strings of a plurality of non-genuine files and an authentication result of each file in the plurality of genuine files and the plurality of non-genuine files, and correspondingly, the performing authentication on the to-be-authenticated file according to the file information of the target file and file information of the to-be-authenticated file includes: if the file information of the target file is consistent with the file information of the to-be-authenticated file, and the target file is a file that is successfully authenticated, determining that the authentication on the to-be-authenticated file succeeds; and if the file information of the target file is consistent with the file information of the to-be-authenticated file, and the target file is a file that is not successfully authenticated, determining that the authentication on the to-be-authenticated file fails.

When the feature database stores file information and feature character strings of a plurality of genuine files, file information and feature character strings of the plurality of non-genuine file, and an authentication result of each group file in the plurality of genuine files and the plurality of non-genuine files, a subsequent query process can be implemented, a repeated authentication process on a file that has been authenticated can be avoided.

Figure 2C:
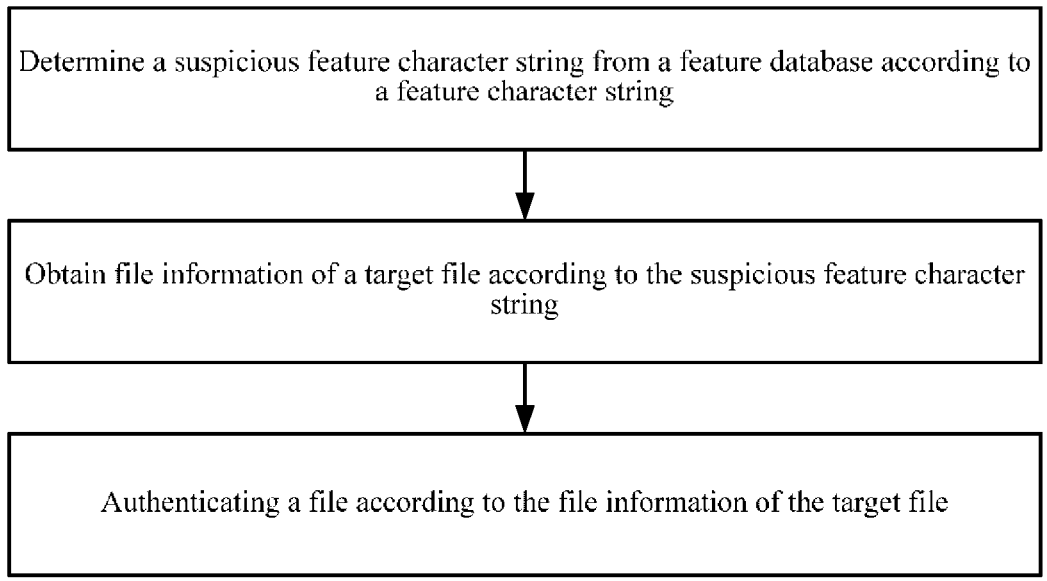
FIG. 2C is a flowchart of performing authentication according to a feature character string according to an embodiment of the present disclosure.

As shown in a flowchart of FIG. 2C, step 203 and step 204 are subsequent authentication processes performed on the feature character string generated according to step 202. That is, a suspicious feature character string is determined from the feature database according to the feature character string. The suspicious feature character string is a feature character string having similarity with the feature character string within a preset range. File information of the target file is obtained according to the suspicious feature character string, and further, authentication is performed on the to-be-authenticated file according to the file information of the target file.

In step 205, if the to-be-authenticated file is successfully authenticated, store the feature character string and the file information of the to-be-authenticated file into the feature database.

When the feature database only stores file information and feature character strings of a plurality of genuine files, if the to-be-authenticated file is successfully authenticated, that is, determining that the to-be-authenticated file is genuine file, the feature character string and the file information of the to-be-authenticated file are stored into the feature database.

Figure 2D:
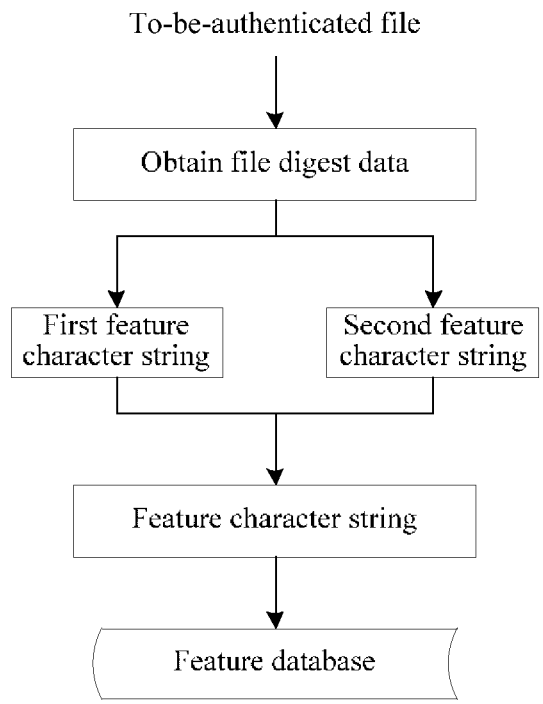
FIG. 2D is a flowchart of storing a feature character string according to an embodiment of the present disclosure.

In another embodiment of the present disclosure, when the feature database stores file information and feature character strings of a plurality of genuine files, file information and feature character strings of the plurality of non-genuine file, and an authentication result of each group file in the plurality of genuine files and the plurality of non-genuine files, after authentication is performed on the to-be-authenticated file according to the file information of the target file and file information of the to-be-authenticated file, the feature character string, the file information, and an authentication result of the to-be-authenticated file are stored into the feature database, so that a repeated authentication process on the to-be-authenticated file can be avoided. A procedure from generating the feature character string of the to-be-authenticated file to storing the feature character string of the to-be-authenticated file into the feature database can be represented by FIG. 2D.

Further, if the to-be-authenticated file is not successfully authenticated, the to-be-authenticated file is recorded as a non-genuine file by marking the file. The file that has been marked may be deleted, or when the to-be-authenticated file is displayed, a user is prompted based on the mark thereof, so that the user learns that the file is risky.

Figure 2E:
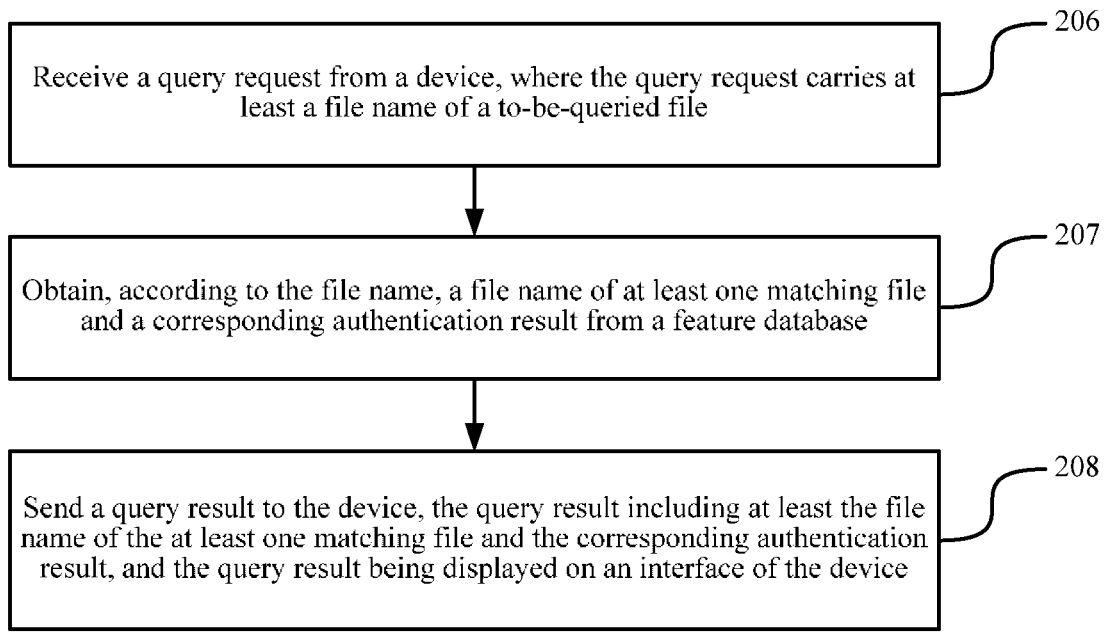
FIG. 2E is a flowchart of a query method according to an embodiment of the present disclosure.

It is noted that when the feature database stores file information and feature character strings of a plurality of genuine files, file information and feature character strings of the plurality of non-genuine file, and an authentication result of each group file in the plurality of genuine files and the plurality of non-genuine files, an information query function can also be implemented. That is, when a user needs to search for a specific application, a file name of a corresponding file is entered in a query interface, so that a server can query, according to the file name, for a file matching the file name in files stored in the feature database. As shown in FIG. 2E, the following steps are specifically included.

In step 206, receive a query request, where the query request carries at least a file name of a to-be-queried file.

An interface of the query service may be set in an application store, or in an application program such as Mobile Manager, or in another application or web page. No limitation is imposed in this embodiment of the present disclosure. When an interface of the query service is set in an application store, when a user wants to download a specific application, a file name of a file corresponding to the application is entered. A server obtains the query request. The query request carries at least the file name of the to-be-queried file, so that the server can make a query according to the file name.

In step 207, obtain, according to the file name, a file name of at least one matching file and a corresponding authentication result from the feature database.

The matching file means a file whose file name matches the file name of the to-be-queried file in all the files in feature database. A method for obtaining, according to the file name of the to-be-queried file, a file name of at least one matching file and a corresponding authentication result from the feature database may be: by means of a character recognition technology, obtaining a file whose file name matching the file name of the to-be-queried file from the feature database, determining the file as a matching file, and then, obtaining an authentication result of the matching file.

For example, when the file name of the to-be-queried file is "Kai Xin Xiao Xiao Le", files whose file names are "Kai Xin Dui Dui Peng", "Dong Wu Xiao Xiao Le", "Tian Tian Ai Xiao Chu", and the like are obtained from the feature database as matching files, and corresponding authentication results are obtained according to the matching files.

It is noted that the at least one matching file may only include a genuine file, or only include a non-genuine file, or include both a genuine file and a non-genuine file. A specific case depends on data stored in the feature database and a file name of the to-be-queried file.

In step 208, feed back or send a query result to a sending end of the query request, where the query result includes at least the file name of the at least one matching file and the corresponding authentication result, so that the file name of the at least one matching file and the corresponding authentication result are displayed on an interface of the sending end.

When a file name of the at least one matching file and a corresponding authentication result are obtained, the query result is fed back to a sending end of the query request, so that the file name of the at least one matching file and the corresponding authentication result are displayed on an interface of the sending end, thereby enabling a user to select a to-be-installed application according to the query result.

It is noted that when the feature database only stores file information and feature character strings of a plurality of genuine files, when the server processes the query request, all the obtained matching files are genuine files. In this case, the step of obtaining an authentication result of the matching file can be obtained.

In another embodiment of the present disclosure, when the feature database does not store related file information matching the file name, prompt information is fed back to the sending end of the query request, so as to display a prompt message, used for prompting a user that no related information is found, on the sending end of the query request. In addition to information used for prompting a user, the prompt message may further include related information of a plurality of recommended applications or other information. No specific limitation is imposed in this embodiment of the present disclosure.

Figure 2F:
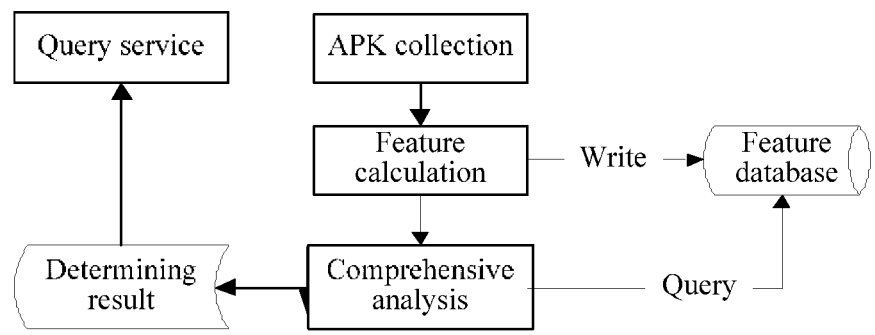
FIG. 2F is a flowchart of a file authentication method according to an embodiment of the present disclosure.

A file authentication system corresponding to the file authentication method of the present disclosure may include four modules, including: a file collection module, a feature calculation module, a comprehensive analysis module, and a query service module. The file collection module is configured to collect a to-be-authenticated file, that is, being configured to perform step 201. The feature calculation module is configured to calculate a feature character string of file digest data, that is, being configured to perform step 202. The comprehensive analysis module is configured to obtain a target file corresponding to the to-be-authenticated file, and perform authentication on the to-be-authenticated file according to the target file, that is, performing step 202 to step 205. The query service module is configured to provide a query service, that is, being configured to perform step 206 to step 208. An overall procedure is shown in FIG. 2F.

According to the file authentication method provided by this embodiment of the present disclosure, by extracting file digest data from a to-be-authenticated file, generating a feature character string of the to-be-authenticated file according to the file digest data, and further determining file information of a target file from a feature database according to the feature character string of the to-be-authenticated file, to perform authentication on the to-be-authenticated file according to the file information of the target file, a to-be-authenticated file can be actively collected, authentication is performed on the to-be-authenticated file to determine whether the to-be-authenticated file is a genuine application or a counterfeit version of a genuine application, and an authentication result is correspondingly stored into a feature database, so that a counterfeit application can be cracked down, and information security of users and interests of service providers are ensured. Further, by storing the feature character string in a form of a K-D tree, file authentication efficiency can be improved. When a query request is received, a corresponding APK software name that is found and an authentication result are sent to a sending end of the query request according to a software name or a package name of an APK file carried the query request, so that a client can learn related genuine files and counterfeit files of the APK file. Further, the client can select a genuine file to implement an application installation function or crack down corresponding counterfeit software. Information security of users and interests of service providers are further ensured.

Figure 3:
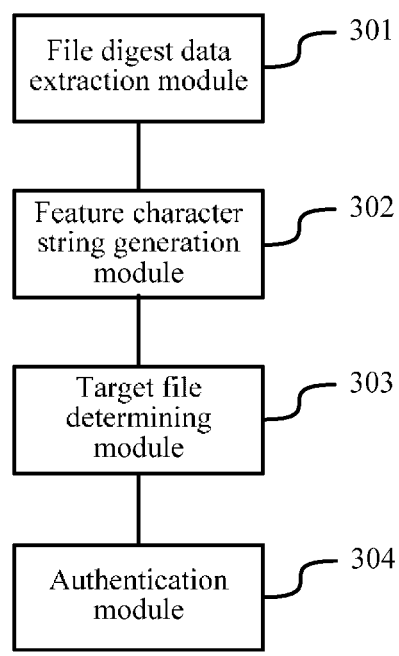
FIG. 3 is a block diagram of a file authentication apparatus according to an embodiment of the present disclosure.

FIG. 3 is a block diagram of a file authentication apparatus according to an embodiment of the present disclosure. Referring to FIG. 3, the apparatus includes a file digest data extraction module 301, a feature character string generation module 302, a target file determining module 303, and an authentication module 304.

The file digest data extraction module 301 is configured to extract file digest data from a to-be-authenticated file, the to-be-authenticated file being an installation package of a to-be-authenticated application, and the file digest data being used for uniquely identifying file content of the to-be-authenticated file.

The feature character string generation module 302 is configured to generate a feature character string of the to-be-authenticated file according to the file digest data.

The target file determining module 303 is configured to determine file information of a target file from a feature database according to the feature character string of the to-be-authenticated file, the target file being a file matching the feature character string of the to-be-authenticated file, the feature database storing at least file information and feature character strings of a plurality of genuine files, and the file information including at least a certificate feature value.

The authentication module 304 is configured to perform authentication on the to-be-authenticated file according to the file information of the target file and file information of the to-be-authenticated file.

In a first implementation provided in the present disclosure, the authentication module is configured to:

if the file information of the target file is consistent with the file information of the to-be-authenticated file, determine that the authentication on the to-be-authenticated file succeeds; and if the file information of the target file is inconsistent with the file information of the to-be-authenticated file, determine that the authentication on the to-be-authenticated file fails.

In a second implementation provided in the present disclosure, the target file determining module is configured to:

calculate similarity between the feature character string of the to-be-authenticated file and each feature character string in the feature database; and determine a file corresponding to a characteristic character string having the similarity within a preset range as a target file of the to-be-authenticated file.

In a third implementation provided in the present disclosure, the similarity is a Hamming distance.

In a fourth implementation provided in the present disclosure, the file digest data is a digest file, the digest file stores file names, file types, and digest information of all resource files in the to-be-authenticated file; and correspondingly, the feature character string generation module is configured to:

generate, according to the file names, file types, and digest information of all the resource files, feature text in accordance with a specified rule; and generate the feature character string of the to-be-authenticated file according to the feature text.

In a fifth implementation provided in the present disclosure, the feature character string generation module is configured to:

generate the feature character string of the to-be-authenticated file according to the feature text by using a sensitive hashing (simhash) algorithm.

In a sixth implementation provided in the present disclosure, the feature character string generation module is configured to:

obtain specified digest information from all the resource files according to the file types of all the resource files, where the specified digest information is digest information of a resource file of a specified type; and generate the feature text according to the specified digest information.

In a seventh implementation provided in the present disclosure, the file digest data is an application icon of the to-be-authenticated application; and correspondingly, the feature character string generation module is configured to:

generate the feature character string of the to-be-authenticated file according to the application icon of the to-be-authenticated application.

In an eighth implementation provided in the present disclosure, the feature character string generation module is configured to:

generate the feature character string of the to-be-authenticated file according to the application icon of the to-be-authenticated application by using a perceptual hash (pHash) algorithm or a scale invariant feature transform (SIFT) algorithm.

In a ninth implementation provided in the present disclosure, the file digest data includes an application icon and a digest file of the to-be-authenticated application, and correspondingly, the feature character string generation module is configured to:

generate a first feature character string of the to-be-authenticated file according to the application icon of the to-be-authenticated application;

generate feature text according to the digest file, and generating a second feature character string of the to-be-authenticated file according to the feature text; and generate the feature character string of to-be-authenticated file according to the first feature character string and the second feature character string.

In a tenth implementation provided in the present disclosure, the feature database further stores a whitelist, and correspondingly the authentication module is configured to:

if the file information of the target file is inconsistent with the file information of the to-be-authenticated file, query whether the whitelist stores the file information of the to-be-authenticated file;

if the whitelist stores the file information of the to-be-authenticated file, determine that the authentication on the to-be-authenticated file succeeds; and if the whitelist does not store the file information of the to-be-authenticated file, determine that the authentication on the to-be-authenticated file fails.

In an eleventh implementation provided in the present disclosure, the whitelist stores file information of all genuine files.

In a twelfth implementation provided in the present disclosure, the apparatus further includes:

a storage module, configured to: if the to-be-authenticated file is successfully authenticated, store the feature character string and the file information of the to-be-authenticated file into the feature database.

In a thirteenth implementation provided in the present disclosure, the feature database further stores file information and feature character strings of a plurality of non-genuine files and an authentication result of each file of the plurality of genuine files and the plurality of non-genuine files, and correspondingly, the authentication module is configured to:

if the file information of the target file is consistent with the file information of the to-be-authenticated file, and the target file is a file that is successfully authenticated, determine that the authentication on the to-be-authenticated file succeeds; and if the file information of the target file is consistent with the file information of the to-be-authenticated file, and the target file is a file that is not successfully authenticated, determine that the authentication on the to-be-authenticated file fails.

In a fourteenth implementation provided in the present disclosure, the apparatus further includes:

a storage module, configured to store the feature character string, the file information, and an authentication result of the to-be-authenticated file into the feature database.

In a fifteenth implementation provided in the present disclosure, the file information further includes a file name, and correspondingly, the apparatus further includes:

a receiving module, configured to receive a query request, where the query request carries at least a file name of a to-be-queried file;

a matching file obtaining module, configured to obtain, according to the file name, a file name of at least one matching file and a corresponding authentication result from the feature database; and a sending module, configured to feed back a query result to a sending end of the query request, where the query result includes at least the file name of the at least one matching file and the corresponding authentication result, so that the file name of the at least one matching file and the corresponding authentication result are displayed on an interface of the sending end.

In a sixteenth implementation provided in the present disclosure, feature character string information in the feature database is stored in a form of a K-D tree.

It is noted that when the file authentication apparatus provided in the foregoing embodiment performs authentication on a file, it is illustrated with an example of division of the foregoing functional modules. In practical application, the foregoing functions may be distributed to different functional modules according to requirements, that is, the internal structure of the apparatus is divided into different functional modules, so as to finish all or part of the functions described above. In addition, the file authentication apparatus provided in the foregoing embodiments and the embodiments of the file authentication method belong to one concept. For specific implementation procedures, refer to the method embodiments, and details are not described herein again.

Figure 4:
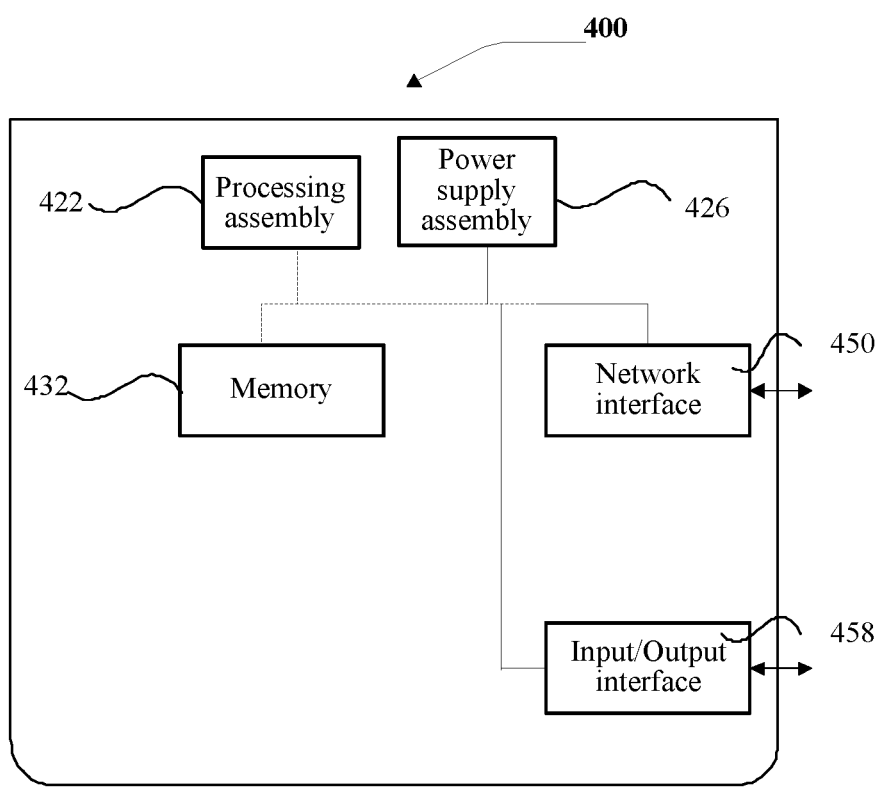
FIG. 4 is a block diagram of a file authentication apparatus according to an embodiment of the present disclosure.

FIG. 4 is a block diagram of a file authentication apparatus 400 according to an embodiment of the present disclosure. For example, the apparatus 400 may be provided as a server. Referring to FIG. 4, the apparatus 400 includes a processing assembly 422, the processing assembly 422 further including one or more processors and processing circuitry, and a memory resource represented by a memory 432, the memory resource being used for storing instructions, for example, an application program, that can be executed by the processing assembly 422. The application program stored in the memory 432 may include one or more modules each of which corresponding to a set of instructions. In addition, the processing assembly 422 is configured as an executable instruction, to execute the foregoing method.

The apparatus 400 may further include a power supply assembly 426, configured to perform power supply management of the apparatus 400, a wired or wireless network interface 450, configured to connect the apparatus 400 to a network, and an input/output (I/O) interface 458. The apparatus 400 may operate an operating system stored in the memory 432, for example, Windows Server™, Mac OS X™, Unix™, Linux™, or Free BSD™.

In an example of an embodiment, a computer readable storage medium including an instruction, such as a memory including an instruction, is further provided, and the instruction may be executed by the processor in the server to complete the file authentication method in the foregoing embodiments. For example, the non-transitory computer readable storage medium may be a ROM, a random access memory (RAM), a CD-ROM, a magnetic tape, a floppy disk, or an optical data storage device.

A person of ordinary skill in the art may understand that all or some of the steps of the foregoing embodiments may be performed by using hardware, or may be performed by a program instructing relevant hardware. The program may be stored in a computer readable storage medium. The storage medium may be a read-only memory, a magnetic disk, an optical disc, or the like.

The foregoing descriptions are merely examples of the present disclosure, but are not intended to limit the present disclosure. Any modification, equivalent replacement, or improvement made within the spirit and principle of the present disclosure shall fall within the protection scope of the present disclosure.

What is claimed is:

1. A file authentication method, comprising:

extracting file digest data from a file to be authenticated, the file to be authenticated including an installation package of an application, the file digest data identifying file information of the file to be authenticated, the file digest data including an application icon and a digest file of the application, and the digest file storing specified digest information of resource files of a specified file type in the installation package;

generating a first feature character string of the file to be authenticated according to the application icon of the application;

generating feature text associated only with the resource files of the specified file type according to the specified digest information;

generating a second feature character string of the file to be authenticated according to the feature text;

generating a feature character string of the file to be authenticated based on a combination of the first feature character string and the second feature character string;

determining file information of a target file that corresponds to the file to be authenticated from a feature database based on the feature character string of the file to be authenticated, the target file matching the feature character string of the file to be authenticated, the feature database storing at least file information of a plurality of genuine files and feature character strings of the plurality of genuine files, and the file information of the target file and the file information of the plurality of genuine files including at least a certificate feature value; and authenticating the file to be authenticated according to (i) the file information of the target file determined based on the feature character string of the file to be authenticated and (ii) the file information of the file to be authenticated.

2. The method according to claim 1, wherein the authenticating the file comprises:

when the file information of the target file is consistent with the file information of the file, determining that the authentication on the file succeeds; and when the file information of the target file is inconsistent with the file information of the file, determining that the authentication on the file fails.

3. The method according to claim 1, wherein the determining the file information of the target file comprises:

calculating similarity between the feature character string of the file and each of the feature character strings in the feature database; and selecting at least one of the feature character strings in the feature database having the similarity within a preset range as the target file.

4. The method according to claim 1, wherein the digest file stores file names, file types, and digest information of all resource files in the installation package.

5. The method according to claim 4, wherein the generating the second feature character string of the file to be authenticated comprises:
generating the second feature character string according to the feature text and a sensitive hashing (simhash) algorithm.

6. The method according to claim 1, wherein the generating the first feature character string of the file to be authenticated comprises:
generating the first feature character string according to the application icon of the application and a perceptual hash (pHash) algorithm or a scale invariant feature transform (SIFT) algorithm.

7. The method according to claim 1, wherein the feature database stores a whitelist, and the authenticating the file according to the file information of the target file and the file information of the file includes
when the file information of the target file is inconsistent with the file information of the file, querying whether the whitelist stores the file information of the file;
when the whitelist stores the file information of the file, determining that the authentication on the file succeeds; and
when the whitelist does not store the file information of the file, determining that the authentication on the file fails.

8. The method according to claim 7, wherein the whitelist stores file information of the plurality of the genuine files.

9. The method according to claim 1, wherein the feature database stores file information and feature character strings of a plurality of non-genuine files and an authentication result of each file in the plurality of genuine files and the plurality of non-genuine files, and the authenticating the file according to the file information of the target file and the file information of the file includes
when the file information of the target file is consistent with the file information of the file, and the target file is successfully authenticated, determining that the authentication on the file succeeds; and
when the file information of the target file is consistent with the file information of the file, and the target file is not successfully authenticated, determining that the authentication on the file fails.

10. The method according to claim 9, wherein the file information includes a file name, and the method further includes
receiving a query request from a device, the query request including at least a file name of a to-be-queried file;
obtaining, according to the file name of the to-be-queried file, a file name of at least one matching file and a corresponding authentication result from the feature database; and
sending a query result to the device, the query result including at least the file name of the at least one matching file and the corresponding authentication result, and the query result being displayed on an interface of the device.

11. The method according to claim 1, wherein the generating the feature character string of the file to be authenticated comprises:
combining the first feature character string and the second feature character string into a single feature character string to generate the feature character string.

12. The method according to claim 1, wherein the generating the feature character string of the file to be authenticated comprises:
directly joining the first feature character string and the second feature character string successively to generate the feature character string.

13. A file authentication apparatus, comprising:
processing circuitry configured to:
extract file digest data from a file to be authenticated, the file to be authenticated including an installation package of an application, the file digest data identifying file information of the file to be authenticated, the file digest data including an application icon and a digest file of the application, and the digest file storing specified digest information of resource files of a specified file type in the installation package;
generate a first feature character string of the file to be authenticated according to the application icon of the application;
generate feature text associated only with the resource files of the specified file type according to the specified digest information;
generate a second feature character string of the file to be authenticated according to the feature text;
generate a feature character string of the file to be authenticated based on a combination of the first feature character string and the second feature character string;
determine file information of a target file that corresponds to the file to be authenticated from a feature database based on the feature character string of the file to be authenticated, the target file matching the feature character string of the file to be authenticated, the feature database storing at least file information of a plurality of genuine files and feature character strings of the plurality of genuine files, and the file information of the target file and the file information of the plurality of genuine files including at least a certificate feature value; and
authenticate the file to be authenticated according to (i) the file information of the target file determined based on the feature character string of the file to be authenticated and (ii) the file information of the file to be authenticated.

14. The file authentication apparatus according to claim 13, wherein the processing circuitry is further configured to
calculate similarity between the feature character string of the file and each of the feature character strings in the feature database; and
select at least one of the feature character strings in the feature database having the similarity within a preset range as the target file.

15. The file authentication apparatus according to claim 13, wherein
the digest file stores file names, file types, and digest information of all resource files in the installation package.

16. The file authentication apparatus according to claim 13, wherein the feature database further stores a whitelist, and the processing circuitry is further configured to
when the file information of the target file is inconsistent with the file information of the file, query whether the whitelist stores the file information of the file;
when the whitelist stores the file information of the file, determine that the authentication on the file succeeds; and
when the whitelist does not store the file information of the file, determine that the authentication on the file fails.

17. A non-transitory computer-readable storage medium storing instructions which when executed by a processor cause the processor to perform:

extracting file digest data from a file to be authenticated, the file to be authenticated including an installation package of an application, the file digest data identifying file information of the file to be authenticated, the file digest data including an application icon and a digest file of the application;

generating a first feature character string of the file to be authenticated according to the application icon of the application, and the digest file storing specified digest information of resource files of a specified file type in the installation package;

generating feature text associated only with the resource files of the specified file type according to the specified digest information;

generating a second feature character string of the file to be authenticated according to the feature text;

generating a feature character string of the file to be authenticated based on a combination of the first feature character string and the second feature character string;

determining file information of a target file that corresponds to the file to be authenticated from a feature database based on the feature character string of the file to be authenticated, the target file matching the feature character string of the file to be authenticated, the feature database storing at least file information of a plurality of genuine files and feature character strings of the plurality of genuine files, and the file information of the target file and the file information of the plurality of genuine files including at least a certificate feature value; and authenticating the file to be authenticated according to (i) the file information of the target file determined based on the feature character string of the file to be authenticated and (ii) the file information of the file to be authenticated.

\* \* \* \* \*